US008533695B2

(12) United States Patent
Harvey

(10) Patent No.: US 8,533,695 B2
(45) Date of Patent: Sep. 10, 2013

(54) COMPILE-TIME BOUNDS CHECKING FOR USER-DEFINED TYPES

(75) Inventor: Daniel Stephen Harvey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 12/892,291

(22) Filed: Sep. 28, 2010

(65) Prior Publication Data

US 2012/0079465 A1 Mar. 29, 2012

(51) Int. Cl.
*G06F 9/44* (2006.01)
*G06F 9/45* (2006.01)

(52) U.S. Cl.
USPC .......................................... 717/146; 717/116

(58) Field of Classification Search
USPC ................................. 717/116, 146
See application file for complete search history.

(56) References Cited

U.S. PATENT DOCUMENTS

| | | | |
|---|---|---|---|
| 4,584,666 A | 4/1986 | Zolnowsky et al. | |
| 5,075,845 A * | 12/1991 | Lai et al. | 711/152 |
| 5,644,709 A | 7/1997 | Austin | |
| 6,014,723 A | 1/2000 | Tremblay et al. | |
| 6,149,318 A | 11/2000 | Chase et al. | |
| 6,154,876 A * | 11/2000 | Haley et al. | 717/133 |
| 6,343,375 B1 | 1/2002 | Gupta et al. | |
| 6,519,765 B1 | 2/2003 | Kawahito et al. | |
| 7,584,461 B2 | 9/2009 | Plum | |
| 2005/0257096 A1 * | 11/2005 | Kielstra | 714/42 |
| 2006/0200486 A1 * | 9/2006 | Castro et al. | 707/102 |
| 2006/0225026 A1 * | 10/2006 | Henaire et al. | 717/100 |
| 2011/0185341 A1 * | 7/2011 | Somakumar et al. | 717/110 |

OTHER PUBLICATIONS

Holzmann, Gerard J., "Static Source Code Checking for User-Defined Properties," Bell Laboratories, 2002, 9pg.*
Leino, et al., "A Polymorphic Intermediate Verification Language: Design and Logical Encoding," Springer-Verlag, 2010, 16pg.*
Necula et al., "CIL: Intermediate Language and Tools for Analysis and Transformation of C Programs," Springer-Verlag, 2002, 16pg.*
"International Search Report", Mailed Date: Mar. 20, 2012, Application No. PCT/US2011/051023, Filed Date: Sep. 9, 2011, pp. 9.

(Continued)

*Primary Examiner* — Li B Zhen
*Assistant Examiner* — Ryan Coyer
(74) *Attorney, Agent, or Firm* — Ogilvie Law Firm

(57) ABSTRACT

Compile-time optimized bounds checking of user-defined types is provided. A user-defined class has an annotated memory-accessing method, and an annotated bound-providing member such as an integer field containing a bound or a method that returns a bound when called. The user-defined-bounds check may supply bounds checking where the programming language has none, or it may supplement existing bounds checks, e.g., by wrapping a built-in array type or a garbage-collector-managed type. Bounds checking can be extended beyond arrays and other types whose layout is controlled by a compiler, allowing efficient systems programming in a managed code environment. A bounds-check representation is inserted by the compiler in intermediate language code. Optimization then reduces duplicative bounds checking.

20 Claims, 2 Drawing Sheets

(56) References Cited

OTHER PUBLICATIONS

Bodik, et al., "ABCD: Eliminating Array Bounds Checks on Demand", Retrieved at <<http://www.classes.cs.uchicago.edu/archive/2006/spring/32630-1/papers/p321-bodik.pdf>>, In the ACM SIGPLAN Conference on Programming language design and implementation, vol. 35, No. 5, May 2000, pp. 321-333.

Detlefs, Dave, "Array Bounds Check Elimination in the CLR", Retrieved at << http://blogs.msdn.com/b/clrcodegeneration/archive/2009/08/13/array-bounds-check-elimination-in-the-clr.aspx >>, Aug. 13, 2009, pp. 4.

Jung, et al., "Design and Optimization of a Java Ahead-of-Time Compiler for Embedded Systems—Published Date: 2008", Retrieved at << http://ieeexplore.ieee.org/stamp/stamp.jsp?arnumber=04756335 >>, IEEE/IFIP International Conference on Embedded and Ubiquitous Computing, Dec. 17-20, 2008, p. 169-175.

Bentley, et al., "Implicit Java Array Bounds Checking on 64bit Architectures", Retrieved at << http://citeseerx.ist.psu.edu/viewdoc/download?doi=10.1.1.128.2566&rep=rep1&type=pdf >>, Proceedings of the 18th annual international conference on Supercomputing, Jun. 26-Jul. 1, 2004, pp. 10.

"PathScale™ Compiler Suite User Guide", Retrieved at << http://www.pathscale.com/docs/UserGuide.pdf >>, Apr. 2004, pp. 358.

Guyer, et al., "Broadway: A Compiler for Exploiting the Domain-Specific Semantics of Software Libraries", Retrieved at << http://citeseerx.ist.psu.edu/viewdoc/download?doi=10.1.1.81.1605&rep=rep1&type=pdf >>, Proceedings of the IEEE, vol. 93 No. 2, Feb. 2005, p. 1-15.

Kennedy, Ken, "Telescoping Languages: A Compiler Strategy for Implementation of High-Level Domain-Specific Programming Systems", Retrieved at << http://ieeexplore.ieee.org/xpls/abs_all.jsp?arnumber=845999 >>, Proceedings of the 14th International Symposium on Parallel and Distributed Processing, May 1-5, 2000, p. 1-8.

"Safe and Secure Software: An Invitation to Ada 2005", Retrieved at << http://www.adacore.com/wp-content/uploads/2008/10/11_safe_secure_ada_2005_certified_safe_with_spark.pdf >>, no later than 2005, pp. 1-12.

"BitC", Retrieved at << http://en.wikipedia.org/wiki/BitC >>, Apr. 5, 2010, pp. 1-2.

"Deputy Quick Reference", Retrieved at << http://deputy.cs.berkeley.edu/quickref.html >>, no later than Aug. 30, 2010, pp. 1-4.

Hongwei Xi et al., "Eliminating Array Bound Checking Through Dependent Types", ACM SIGPLAN '98, no later than 1998, pp. 249-257.

"SPARK (programming language)", Retrieved at << http://en.wikipedia.org/wiki/SPARK_(programming_language) >>, Aug. 11, 2010, pp. 1-5.

"Agda", Retrieved at << http://wiki.portal.chalmers.se/agda/agda.php >>, Aug. 27, 2010, pp. 1.

\* cited by examiner

COMPILE-TIME BOUNDS CHECKING FOR USER-DEFINED TYPES

BACKGROUND

Bounds checking may be done in computer programs to detect whether a variable is within some specified bounds. For example, a value may be checked before it is used as an index into an array to determine whether the value lies within the bounds of the array; this kind of bounds checking is sometimes called index checking or range checking. A failed bounds check may generate a runtime error, such as an exception signal. An attempt to access an array or other variable outside its bounds often indicates a programming error. However, performing a bounds check before every use of a bounded variable is not always done, because bounds checks increase program execution time.

Compilers sometimes automatically eliminate bounds checks that are deemed unnecessary. As an example, consider program code that reads a value from a location within an array and then stores another value (or the same value) back into that same location. Without any optimization, this code might include a first bounds check when the array location is read from the array and a second bounds check when the same location in the array is written. But a compiler or other optimizing tool may automatically eliminate the second bounds check after determining that the array size is unchanged and that the same location in the array is being read and then written. More generally, a variety of optimizations are used in compilers and other tools to automatically reduce or eliminate redundant bounds checks.

SUMMARY

Automated bounds checking on array accesses is not always used, due to its actual (or perceived) impact on program performance. But automatic bounds checking is nonetheless readily available to developers who choose to use it for safer access to arrays. When developers use custom data types that have more intricate structure, however, or otherwise depart from a simple array, checking for access violations has sometimes involved manually inserting bounds check code. Unfortunately, when developers write bounds checks explicitly, the purpose of the bounds check code may not be apparent to a compiler, so the compiler lacks knowledge that would allow it to remove redundant bounds checks.

Some embodiments described herein provide automatic compile-time bounds checking of user-defined types, in part by identifying in a source code a user-defined class for safely accessing explicitly allocated memory. The user-defined class has a memory-accessing code member which was annotated by a developer with a user-defined-bounds check annotation, e.g, an annotation indicating to the compiler that the code accesses a memory-mapped buffer or other explicitly allocated memory. The user-defined class also has a bound-providing member which is annotated by a developer to indicate to the compiler that it provides bound information for generating a bounds check on the memory-accessing code. The bound-providing member may be an integer field containing a bound, for example, or a method that returns a bound when called.

The user-defined-bounds check may supply bounds checking where the programming language has none, or it may supplement existing bounds checks, e.g., by wrapping a built-in array type or a garbage-collector-managed type. Bounds checking can be extended beyond arrays and other types whose layout is controlled by a compiler; the user-defined class may be defined without using any multi-element array type as a constituent type.

A bounds-check representation of the user-defined-bounds check annotation is inserted by the compiler in intermediate language code. An optimization then automatically reduces duplicative bounds checking that would otherwise occur in the executable code. The optimization may be applied to the intermediate language bounds-check representations, to the inserted bounds checking code, or to both.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
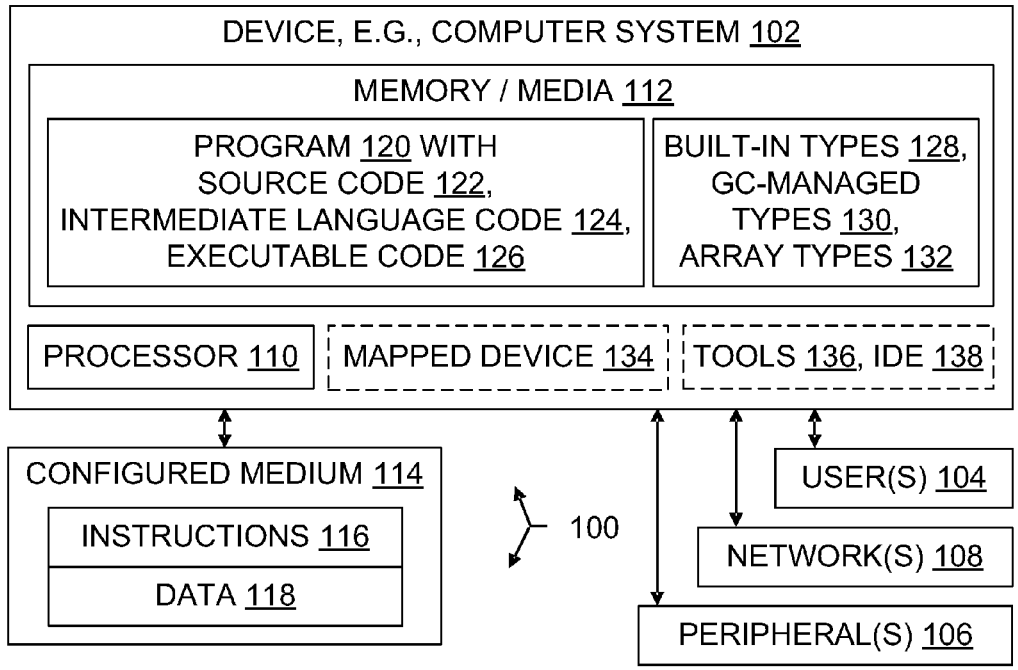
FIG. 1 is a block diagram illustrating a computer system having at least one processor, at least one memory, at least one program source code, and other items in an operating environment which may be present on multiple network nodes, and also illustrating configured storage medium embodiments.

Today's managed code systems, like those in the Microsoft® .NET and Java® environments (marks of Microsoft Corporation and Oracle America, Inc., respectively), often assume that all memory used by the managed code program is allocated and managed automatically. In systems programming, however, and particularly in device-driver programming, this assumption may fail. In some cases, memory used by a device driver is fixed in position by the physical device, as when a buffer on the device is memory-mapped into a specific set of addresses. In other cases, memory is explicitly managed to avoid unnecessary copying of data or to reuse buffers within a certain time limit.

In some languages, such as C#, when a program uses explicitly-allocated memory, a programmer will frequently utilize an unsafe pointer to the unmanaged data structure. Great care may be needed to avoid errors when accessing the pointer or doing pointer arithmetic. Unsafe pointers can negate correctness benefits of managed code, since incorrect pointer arithmetic could lead to memory corruption or a program crash. Such errors can be particularly difficult to debug in the presence of garbage collection. When programmers write custom data structures and wish to perform bounds checking for safety, they may write the bounds checks explicitly as lines of source code. The purpose of such code is indistinguishable by the compiler from the purpose of other lines of the code, in which case the compiler lacks information allowing it to remove the explicit bounds checks.

Some embodiments described herein allow managed code to safely and efficiently access explicitly allocated memory. Managed code can thus be used efficiently for systems programming. By using managed code for systems programming with compile-time optimized bounds checking as described herein, programmers can write efficient device drivers in managed code and eliminate common errors in device drivers that are frequent causes of operating system crashes.

Some embodiments described herein may be viewed in a broader context. For instance, concepts such as memory access, variable boundaries, source code annotation, and compilation, may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving memory access, bounds checking, compilation and/or source annotation, for example, are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

Throughout this document, use of the optional plural "(s)" means that one or more of the indicated feature is present. For example, "annotation(s)" means "one or more annotations" or equivalently "at least one annotation".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "transmitting", "sending", "communicating", "applying", "inserting", annotating", "denoting", "specifying", or otherwise targeting a destination may involve intervening action such as forwarding, copying, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, and/or optical media, as opposed to media that merely propagates a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by flexible compile-time optimized bounds checking as discussed herein, e.g., by inserting, applying, specifying, annotating, denoting, binding, deployment, execution, modification, display, creation, loading, and/or other operations.

A program 120 (with source code 122, intermediate language code 124, and executable code 126, for example), debuggers, compilers and other development tools 136, other software, and other items shown in the Figures may reside partially or entirely within one or more media 112, thereby configuring those media. Intermediate language code 124 is sometimes referred to as an intermediate representation. The program 120 may include built-in types 128 and garbage-collector-managed types 130, for example. In many development configurations, array types 132 are both built-in and managed. In addition to the processor(s) 110, an operating environment may include other hardware, such as displays, memory-mapped devices 134, buses, power supplies, and accelerators, for instance.

A given operating environment 100 may include an Integrated Development Environment (IDE) 138 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C#("C-Sharp"), but teachings herein are applicable with a wide variety of programming languages, programming models, and programs.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
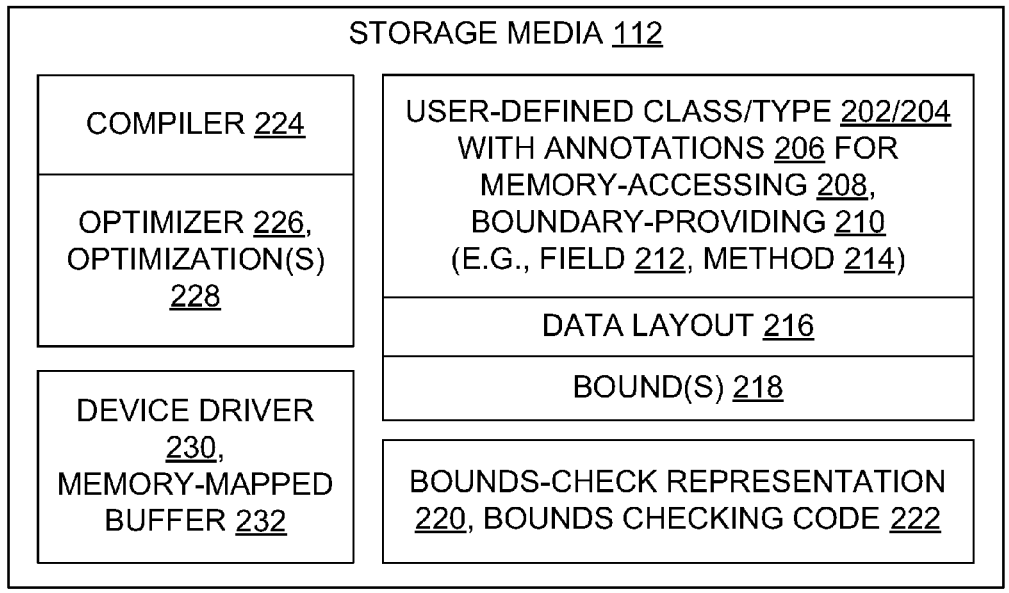
FIG. 2 is a block diagram illustrating compile-time bounds checking of arbitrarily complex user-defined data types, in an example architecture.

FIG. 2 illustrates an architecture which is suitable for use with some embodiments. A user-defined type 204, such as a user-defined class 202, has annotations 206 for conveying developer bounds-checking intentions to a compiler 224 in a manner that allows the compiler to not only provide bounds checking but to also remove redundant bounds checks. Annotations may identify memory-accessing 208 code and boundary-providing 210 code in the user-defined type, for example. Memory-accessing code may be inline statements and/or distinct methods, for example. Boundary-providing code may be fields 212 that contain bounds 218 and/or methods 214 that return bounds 218 when called.

Although array index checking can be very useful, the focus herein is on other kinds of bounds checking, namely, bounds checking for user-defined structures which are not mere arrays. Unlike a familiar array type 132, the class 202 or other user-defined type 204 is not built-in, and hence may have a data layout 216 that is not controlled by the compiler 224.

In some embodiments, the compiler 224 inserts bounds-check representations 220 in intermediate language code 124 in response to the annotations 206. Bounds checking code 222 is subsequently placed in the executable code 126 in response to the bounds-check representations 220. Familiar conventions for intermediate language code 124 can be respected by the bounds-check representations 220, and the bounds checking code 222 generated may include familiar conditional jump instructions and the like. However, the context of these familiar conventions and instructions, for present purposes, is user-defined types which are not mere arrays and which in some embodiments do not even use arrays as constituent types.

In some embodiments, an optimizer 226 applies optimization(s) 228 to the bounds-check representations 220, to the bounds checking code 222, or both, in order to remove redundant bounds checking that would otherwise occur in the executable code 126. The optimizer 226 may be integrated in the compiler 224, or it may be a separate tool that is invoked by the compiler 224 or by the developer, depending on the embodiment. Optimizations used with array bound checking can be adapted and applied instead to user-defined types. Given the benefit of the annotations 206 on a type 204, for example, the optimizer may determine that all accesses inside a loop to a variable of that user-defined type 204 are within the allowable memory address bounds of the variable, and thus the optimizer can remove multiple bound checks that would otherwise occur as a result of executing the loop.

As suggested by FIG. 2, user-defined types and optimized compile-time bounds checks may be particularly useful in developing device driver 230 code as the program 120. Managed code can be used for systems programming, and the device driver can be developed using an IDE 138 for execution in a system that provides garbage collection of memory that is not explicitly allocated. Memory that is explicitly allocated, and hence not garbage-collected, can be managed by the developer's code without sacrificing bounds checking and without imposing grossly inefficient bounds checking. For example, a class 202 may be defined to include an explicitly allocated memory-mapped buffer 232 for a device 134, with an annotated buffer accessing 208 method or methods to read/write the buffer. The size of the buffer may be determined dynamically, and then provided to the bounds checking code by way of an annotation 206 and a boundary-providing 210 mechanism such as a bufferBound field 212 or a getBufferBound( ) method 214.

With reference to FIG. 1 and, some embodiments provide a computer system 102 with a logical processor 110 and a memory medium 112 configured by circuitry, firmware, and/or software to transform code 122, 124, 126 in support of optimized compile-time bounds checking as described herein. The memory is in operable communication with the logical processor. A source code 122 residing in the memory has a user-defined type 204. The user-defined type has a memory-accessing 208 method which is annotated with a user-defined-bounds check annotation 206. The user-defined type also has at least one bound specifier such as a boundary-providing 210 field or method. A compiler 224 residing in the memory is configured to insert into an intermediate language code 124 a bounds-check representation 220 of the user-defined-bounds check annotation. An optimizer 226 residing in the memory is configured to apply an optimization 228 to the intermediate language code in order to reduce duplicative bounds checking.

In some embodiments, the annotated source code includes device driver 230 source code 122, and the user-defined type 204 corresponds to a memory-mapped buffer 232. Memory-mapped buffers are merely an example; in some embodiments, the annotated device driver code accesses other explicitly allocated memory 112.

In some embodiments, the annotated source code includes garbage-collected data types 130, and the user-defined type corresponds to explicitly allocated memory. In some embodiments, the user-defined type 204 has a data layout 216 which is not controlled by the compiler 224. In some embodiments, the user-defined type 204 is defined free of any multi-element array type as a constituent type. In others, the user-defined type 204 has one or more arrays as constituent types but is more complex than an array. In some, the user-defined type 204 wraps an array type and provides supplemental bounds checking, e.g., to check not only that an array access not only lies within the space allocated to the array but also lies within the space holding updated elements, or within a sub-portion of an array that is intended by the developer to hold a specified set of values, for example.

In some embodiments, the bound specifier (a.k.a. boundary-providing 210 mechanism) includes at least one of the following: a field-contains-bound annotation 206 indicating that a field 212 in the user-defined data type 204 contains a bound 218 for a memory-accessing 208 method; a bound-getter-method annotation 206 indicating that a bound-getting method 214 in the user-defined data type 204 returns a bound 218 for the memory-accessing 208 method.

In some embodiments, the system 102 includes intermediate language code 124 residing in the memory, and the code 124 is annotated with a bounds-check representation 220 of the user-defined-bounds check annotation 206. In some, the compiler 224 is configured to insert bounds checking code 222 not only for user-defined-bounds check annotations 206 but also for built-in types 128. In some embodiments, user-defined-bounds check annotation 206 indicates supplemental bounds checking, in that the user-defined type 204 wraps a built-in type 128 which the compiler 224 is configured to already bounds check regardless of whether any user-defined-bounds check annotation 206 is present.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

Figure 3:
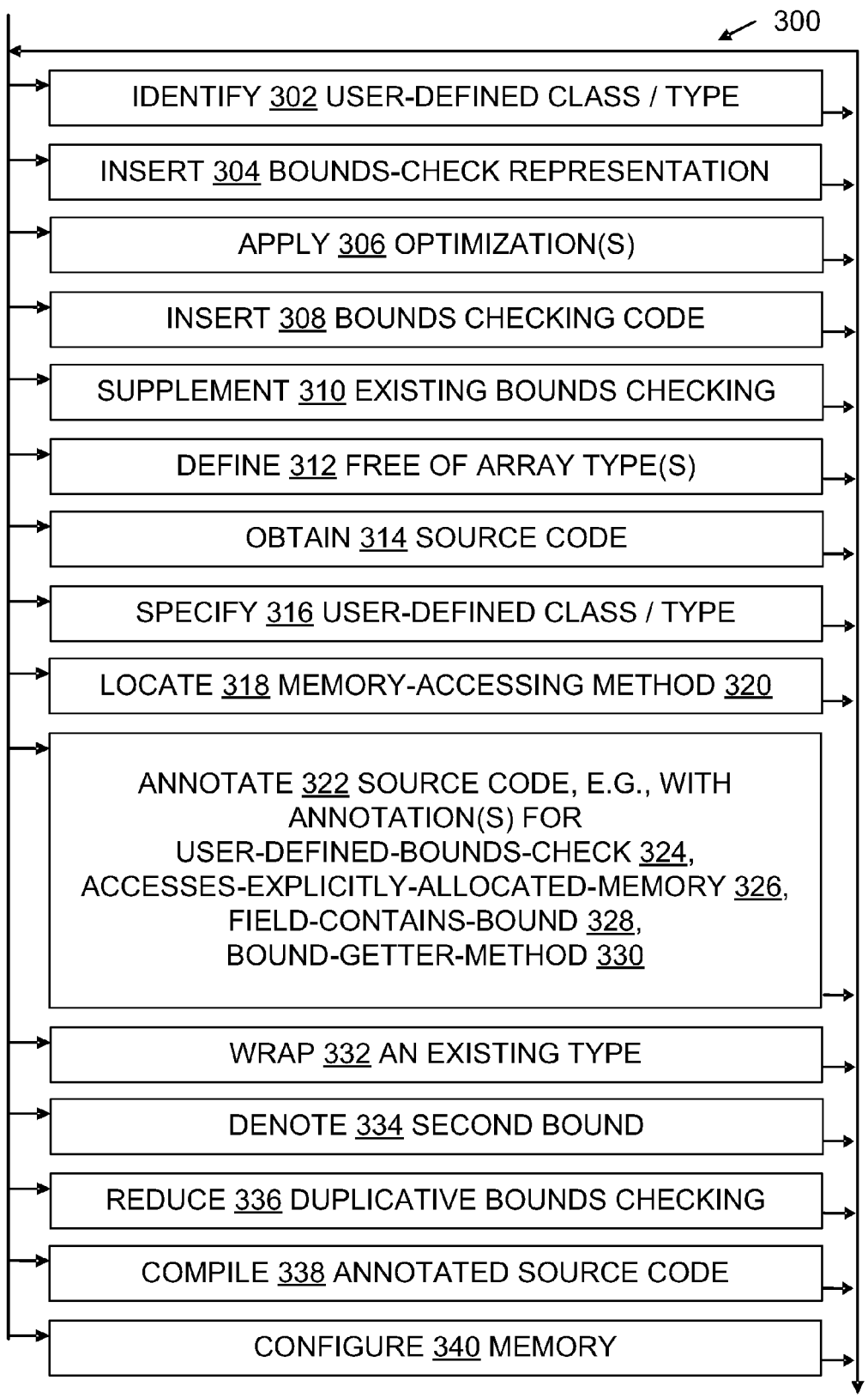
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by a compiler 224 and optimizer 226 under control of a script requiring little or no user input, or by an automated source code 122 generator that generates a user-defined type 204 from user-supplied specifications. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a user-defined type identifying step 302, an embodiment identifies a user-defined type 204 in a source code. Step 302 may be accomplished using lexical analyzers, parsers, and/or other mechanisms, for example, adapted to identify user-defined types 204 as described herein. Specifically, mechanisms used to recognize familiar source code annotations may be adapted to recognize annotations 206 by keyword.

During a bounds-check representation inserting step 304, an embodiment inserts a bounds-check representation 220 into intermediate language code 124 during compilation of the corresponding annotated source code. Step 304 may be accomplished using parse trees, abstract syntax trees, attributes, generalized dope vectors, and/or other mechanisms, for example, adapted to represent bounds check annotations 206 as described herein.

During an optimization applying step 306, an embodiment applies optimization(s) 228 to reduce or eliminate redundant bounds checking. The optimization may be applied to source code, to intermediate code, and/or to executable code, to reduce duplicative bounds checking that would otherwise occur in the executable code. Step 306 may be accomplished by analytically determining that a memory access which is subject to bounds checking cannot assume a value during execution that would result in a memory access outside allowed bounds. For example, if a pointer has been bounds-checked at a first point in the code, and if the bounds and the pointer value cannot have changed at a second point later in execution of the code, then no bounds check is needed at the second point. As another example, if a pointer has been bounds-checked at a first point in the code, and if the pointer value cannot have changed more in a given direction than the bounds have changed in that direction at a second point later in execution of the code, then no bounds check is needed at the second point. As yet another example, if a memory access is unreachable by any flow of control during execution of the code, then no bounds check is needed for that memory access.

During a bounds checking code inserting step 308, an embodiment inserts bounds checking code 222 into executable code 126 during compilation of the corresponding annotated source code. Some embodiments keep intermediate language code 124 and executable code 126 separate, e.g., in separate files, while other embodiments mix intermediate language code 124 and executable code 126. Thus it may happen that step 308 inserts bounds checking code 222 into executable code 126 that appears in the same file or the same block of working memory as intermediate language code 124. Step 308 may be accomplished using parse trees, abstract syntax trees, instruction selection, instruction scheduling, register allocation, and/or other mechanisms, for example, adapted to insert bounds checking code 222.

During a bounds check supplementing step 310, an embodiment supplements bounds checking already provided, such as bounds checking of built-in types, or bounds checking of simple array types, for example. Step 310 may be accomplished by defining a type 204 which has a bounds-checked constituent type, for example, or by compiling such a type. Thus, supplementing step 310 may occur during bounds-check representation inserting step 304 and/or during bounds checking code inserting step 308, if the insertion supplements previously provided bounds checking. Supplementing step 310 may also be performed by a developer who defines a type 204 which is annotated to add more bounds checking to previously indicated bounds checking.

During a particular type defining step 312, a user defines a type 204 which is free of array types 132, that is, a type 204 which has no array types as constituent types. A class 202 is considered to be an example of a user-defined type 204. A single-valued variable, such as an integer variable, is not considered a special case of an array; for the purposes of step 312, arrays have at least two elements. The absence of arrays in types defined by step 312 serves to emphasize the improved flexibility of compile-time bounds checking as described herein, in comparison with familiar array-specific bounds checking. Familiar source code editing tools and development environments 138 may be used by developers to receive types 204 defined during step 312.

During a source code obtaining step 314, a developer or an embodiment acting on behalf of a developer obtains a source code 122. Step 314 may be accomplished using file systems, networks, IDEs 138, and/or other familiar mechanisms.

During a type specifying step 316, a developer or an embodiment acting on behalf of a developer specifies a user-defined type 204 (which may for example be a user-defined class 202) in the source code 122. Familiar source code editing tools and development environments 138 may be used by developers to specify types 204 during step 316. In particular embodiments, step 316 may include defining step 312 and/or supplementing step 310.

During a method locating step 318, a developer or an embodiment acting on behalf of a developer locates a memory-accessing method 320 which is defined (e.g., specified 316) by a user-defined type 204. Such methods 320 are examples of memory-accessing code in general. Step 318 may be accomplished using familiar source code editing tools and development environments 138, and in particular, keyword search capabilities of the same.

During annotating step(s) 322, a developer or an embodiment acting on behalf of a developer annotates source code to provide the compiler 224 with bounds checking information for memory that will be explicitly allocated to hold objects or other variables of a user-defined type 204. For example, memory-accessing code may be annotated with a user-defined-bounds-check 324 annotation 206, which indicates that the code accesses (or may access) memory that is explicitly allocated and/or otherwise subject to bounds checks beyond whatever checking is provided by the language environment without the annotations 206. Code which accesses (or may access) memory that is explicitly allocated may be identified to the compiler 224 by an accesses-explicitly-allocated-memory 326 annotation 206. Boundary-providing 210 annotations 206 may be placed to annotate 322 mechanisms indicating bounds, such as by annotating 322 a field 212 with a field-contains-bound 328 annotation 206, or by annotating 322 a method 214 with a bound-getter-method 330 annotation 206.

During a wrapping step 332, a developer or an embodiment acting on behalf of a developer wraps an existing type in a user-defined type 204. That is, the user defines (specifies) a type 204 which has an existing type as a constituent type, thereby supplementing 310 the existing type's bound checking if it had any. Step 332 may be accomplished using familiar source code editing tools and development environments 138.

During a second bound denoting step 334, a developer or an embodiment acting on behalf of a developer denotes a second bound 218 condition for a user-defined type 204. That is, the user supplements 310 the user-defined type's bound checking by specifying a different bound. For instance, a type may have a first bound which reflects total allocated memory and also have a second bound which reflects actual use of the allocated memory, e.g., records that have been marked "obsolete" may be considered out of bounds even if they reside in the memory allocated to hold records. Step 334 may be accomplished using familiar source code editing tools and environments 138.

During a duplicative bounds checking reducing step 336, an embodiment reduces duplicative bounds checking, e.g., by applying 306 optimization(s) 228 which succeed in locating and removing at least one redundant bounds check.

During a compiling step 338, an embodiment compiles annotated 322 source code. Step 338 may be accomplished using familiar compilation tools and techniques adapted to provide compile-time optimized bounds checking of user-defined types as described herein.

During a memory configuring step 340, a memory medium 112 is configured by a user-defined type 204, an optimizing compiler 224, 226, and/or otherwise in connection with compile-time optimized bounds checking of user-defined types as discussed herein.

The foregoing steps and their interrelationships are discussed in greater detail below, in connection with various embodiments.

Some embodiments provide a process for compile-time bounds checking of user-defined types. The process includes steps performed during compilation of a program from a source code through an intermediate language code to an executable code. A user-defined class 202 or other type 204 in the source code is identified 302. The class may be intended for safely accessing explicitly allocated memory, for example. In some embodiments, the user-defined class is defined 312 free of any multi-element array type as a constituent type. A user-defined class may have as an annotated member a memory-accessing 208 code which is annotated 322 with a user-defined-bounds check 324 annotation 206. The class 202 may also have as an annotated member a boundary-providing 210 member which is annotated 322 to indicate that it provides bound 218 information for generating a bounds check on the memory-accessing code. In response to the annotated type 204, a bounds-check representation 220 of the user-defined-bounds check annotation is inserted 304 into the intermediate language code, and in some cases an optimization 228 is applied 306 in an effort to reduce duplicative bounds checking that would otherwise occur in the executable code.

In some embodiments, the process includes inserting 308 bounds checking code into the intermediate language code in response to bounds-check representations, and the applying step applies 306 the optimization to inserted bounds checking code rather than applying the optimization to bounds-check representation(s). In some embodiments, the applying step applies 306 the optimization to bounds-check representation(s) 220 rather than applying the optimization to bounds checking code 222.

In some embodiments, the identifying step identifies 302 a memory-accessing method 320 which has been annotated 322 with an accesses-explicitly-allocated-memory 326 annotation. In some, the identifying step identifies 302 an annotation 206 indicating user-defined bounds checking which is intended to supplement 310 system-defined bounds checking of a built-in type 128. In some, the identifying step identifies 302 an annotation 206 indicating user-defined bounds checking which is meant to supplement 310 system-defined bounds checking of a garbage-collector-managed type 130.

Some embodiments provide a process for a program developer to manage compile-time bounds checking of user-defined types, namely, types which are not built-in. The process includes obtaining 314 a source code of a computer program, and specifying 316 a user-defined data type in the source code (e.g., by writing a type 204 or by accepting one written previously). The process also includes locating 318 a memory-accessing method 320 which is defined by the user-defined data type, and annotating 322 the memory-accessing method, e.g., with an accesses-explicitly-allocated-memory 326 or other annotation 206. In addition, the process includes annotating 322 the source code with at least one of the following: a field-contains-bound 328 annotation 206 indicating that a field 212 defined by the user-defined data type 204 contains a bound 218 value for the memory-accessing method, a bound-getter-method 330 annotation 206 indicating that a bound-getting method 214 defined by the user-defined data type returns a bound 218 value for the memory-accessing method.

In some embodiments, the developer annotates 322 the source code with an annotation 206 denoting 334 a second bound for the memory-accessing method. In some, the user-defined type 204 wraps 332 a built-in array type 128, 132. In some, the user-defined type 204 wraps 332 a built-in managed type 128, 130.

Configured Media

Some embodiments include a configured computer-readable storage medium 112. Storage medium 112 may include disks (magnetic, optical, or otherwise), RAM, EEPROMS or other ROMs, and/or other configurable memory, as opposed to propagated signal media. The storage medium which is configured may be in particular a removable storage medium 114 such as a CD, DVD, or flash memory. A general-purpose memory, which may be removable or not, and may be volatile or not, can be configured into an embodiment using items such as user-defined types 204 (including their annotations 206), and/or optimizers 226 (which are adapted to process annotations 206), in the form of data 118 and instructions 116, read from a removable medium 114 and/or another source such as a network connection, to form a configured medium. The configured storage medium 112 is capable of causing a computer system to perform process steps for transforming source and other codes through annotation and compile-time optimized flexible bounds checking as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured storage medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Some embodiments described herein provide the following aspects.

First, a way of allowing a programmer to define a data type 204 (e.g., a class 202) for accessing explicitly-allocated memory in a safe fashion.

The programmer can use a set of annotations 206, which the programmer places on methods defined by the data type. One kind of annotation 206 indicates that the annotated method accesses explicitly-allocated memory and should be protected by a bounds check. Another kind of annotation 206 indicates that a field 212 in the data type contains the bound 218 on the memory access. A third kind of annotation 206 indicates that a method 214 in the data type returns the bound on the memory access. Either the second kind or third kind of annotation (or both) may be used with a particular instance of the first kind of annotation.

Second, a compiler 224 represents these annotations 206 in its intermediate representation, that is, in intermediate language code.

Third, based on the annotations in the intermediate representation, the compiler 224 inserts bound checks before calls to methods 320 that access explicitly-allocated memory.

Fourth, after inserting 304/308 bounds checks, the compiler does optimization that reduces 336 (and thus possibly eliminates) unnecessary bounds checks. These optimizations 228 may be adapted for use in the present context from optimizations which are familiar in the literature, by extending the array optimization to understand the annotated intermediate representation and eliminate the bound checks inserted before calls to methods that access explicitly allocated memory which is more complex than mere arrays. The compiler 224 or other optimizer 226 identifies comparisons against fields that contain bound accesses or methods that return bound accesses, and the checks inserted before function calls and then symbolically determines (via approaches adapted from familiar techniques for eliminating unnecessary bounds checks on arrays) whether the checks can be safely eliminated.

In this way, a programmer can use the explicitly-allocated memory in a relatively safe fashion. This allows efficient, safe access to explicitly-allocated memory in managed code.

In some embodiments, the compiler 224 provides a set of attributes that can be applied to any data structure, including data structures which are not mere arrays. In this manner, such embodiments generalize and add flexibility to earlier work on bounds-checking, e.g., work which is specific to arrays as built-in language types. These embodiments allow the programmer to apply bounds-checking to alternative data structures which are defined by the programmer, and in particular, allow bound checking in situations in which a compiler and language system do not control data layout 216, or wherein data layout 216 may be arbitrary.

Some embodiments take inspiration from the idea of "dope vectors", which were used in the implementation of arrays in programming languages, and modify the concept on the way to reaching an embodiment in which the programmer may define the bounds-checked data structure, instead of the data structure being defined by the language implementation. A familiar dope vector contains a pointer to a block of memory that contains the array elements, the bounds of the array, and possibly other information. Some embodiments are or can be integrated with familiar work on array bounds check elimination so that a program is made more efficient both with regard to familiar array bound checking and with regard to the flexible user-defined type 204 bound checking taught herein.

In some embodiments, the annotations 206 describe a correctness check that is enforced at runtime if necessary, not a high-level semantic property of a library operation. The optimizer 226 attempts to eliminate unnecessary checks. In other work, by contrast, an optimizer uses annotations to describe semantic properties of a library and optimize the usage of the libraries, not to reduce 336 unnecessary safety checks as described herein.

Some embodiments have an operating environment 100 containing the Microsoft® Common Language Runtime (CLR), a relatively large runtime that includes services and features such as just-in-time (JIT) compilation, garbage collection (GC), runtime reflection, and much more. Some have an environment 100 which closely follows the C model with traditional (now sometimes called ahead-of-time) compilation, although some GC may be provided for type-safety purposes.

In some embodiments, C# allows one to annotate return values so that can be used for allowing attributes on methods:
[return: SomeAttribute]
int SomeMethod( ){ . . . }

In some embodiments, compiler-generated and compiler-removed bounds checks are available for, but not limited to, data structures which have indexed pools of unmanaged resources, typically memory. Programmers may annotate their data structures so that a compiler 224 will generate bounds checks which behave at runtime similarly to array bounds checks (e.g., by raising an exception upon violation of a boundary) and which may get removed by an approach adapted from the familiar Array Bounds Checks on Demand (ABCD) approach or from familiar optimizations which replace ABCD.

In some embodiments, three custom attributes are provided.

A BoundsChecking attribute is applied to annotated methods 320. In response, the compiler 224 will insert bounds checks at the call sites to methods marked as BoundsChecking. In one embodiment, the compiler 224 requires a BoundsChecking method to have at least one argument, and requires that the first argument is Int32 type. The bounds check will check that the first argument is between zero and the field marked Bound (see below). In this embodiment, all types with a BoundsChecking method have exactly one Int32 field marked Bound. Removing safety checks due to adding BoundsChecking should be considered a breaking change.

A Bound attribute is applied to annotated fields 212. In one embodiment, the field is an Int32 and will be used by the bounds check generated by BoundsChecking method in the same type 204.

A BoundGetter attribute is applied to annotated methods 214. In one embodiment, if a method which returns a Bound won't be inlined, it can be marked BoundGetter, and calls to it will be treated as accessing the Bound.

In some embodiments, the compiler 224 will check the requirements described above, but it is the programmer's responsibility to ensure Bound is only applied to meaningful fields and BoundGetter is only applied to method(s) which return the Bound (or a value less than the Bound). In one embodiment which has adapted array based optimizations to remove the bounds checks, the checks may be unsafely removed if the Bound field is mutated.

Some embodiments, take a type based approach, and expect that users will write a type that is shaped like an array, and ask the user to describe that shape to the compiler (where is the length, where is the accessor). But structured types aren't required in every embodiment. In some embodiments, characteristics involved include the fact that a location in user code requires a check against some user variable and the compiler is instructed how to construct that check. Some embodiments shape the available checks to look like array checks [0, length), as an implementation choice.

Some embodiments put [BoundsChecking] on methods 320. Some also place them directly in the source at other memory-accessing 208 code, such as in the following example:

```
void Foo(int i) {
    byte* p = ...
    [BoundsChecking] (or [BoundsChecking(i)]
    ...*(p + i) ...
}
```

In practice, this kind of annotation may be ruled out by some source language standards. It is not followed in Microsoft Intermediate Language (MSIL), which is an implementation of a standard, ECMA 335, but may be followed in other languages.

Some embodiments are not restricted to protecting explicitly allocated memory. For example, one might wrap 332 a managed array like so:

```
class List {
    int[ ] arr = new int[20];
    [Bound]
    int count = 0;
    void Add(int i) {
        arr[count] = i;
        count = count + 1;
    }
    [BoundsChecking]
    void Get(int i) {
        return arr[i];
    }
}
```

In this example, the language provides existing array bounds checks on arr, but the developer also wants stronger supplemental checks, to ensure not only that i is less than 20, but also that it is less than the number of items that have been added to the list. Both checks may be candidates for removal through the array bounds check and/or other optimization.

Exclusions

To further illustrate and clarify differences between the flexible compile-time bounds checking described herein and prior approaches, the following discussion of familiar array bounds checking is provided. The concepts and technology described in this discussion may be compatible in practice with embodiments taught herein in that neither prevents use of the other, but they lie outside the scope of the embodiments for which protection is sought here.

In a context of bound attribute convergence, one approach notes attributes that may appear on a field, parameter, or return value of pointer or C# array or array type:

[StaticBound(n)], where n is some literal integer.

[BoundedBy(ident)], where ident is an identifier that is either:

Some other field of integral type that is a member of the same immediately containing structure, or Some other formal parameter of the same procedure/method, or In the return value case, it's actually attached on the method.

These can be collapsed to a single attribute if the argument is allowed to be defined as {string|int}; we may not need a second attribute name.

If the field/parameter carrying these attributes is a pointer, the presence of the attribute carries a contract that indexing operations through the pointer must be checked. From a social perspective, it may be noted that it's easier to back off compatibly than to go the other way.

An attribute that can appear on an parameter, field, or return value acting as an index (which must be of some integral type):

[Range(begin, end)], where begin and end may be either literal integers or identifiers encoded as strings, and the normal expectation is that begin will be the literal constant zero.

When this attribute appears on a formal parameter it indicates that the caller must range check/discharge the actual parameter.

When this attribute appears on a field it indicates that the RHS of assignment or initialization must be range checked or equivalently discharged.

When this attribute appears on a method, it indicates a requirement on the return value that the method must check/discharge prior to return.

With regard to version bubbles, through mangling and wrapping it is possible to be downwards compatible with oblivious callers if that proves desirable.

Range may be more precisely captured as:

[Range(inclusiveBase, ExclusiveBound)]

As to the pros and cons of the exclusive bound, one disadvantage may be inability to encode (e.g.) MAXINT for ints. The alternative [Range(inclusiveBase, InclusiveBound)] would almost invariably turn into a use-case of the form: [Range(0, boundIdent−1)], which seems awkward and raises the problem of expressions in attributes.

That problem can straightforwardly be solved by using a different attribute in cases where the maximum representable value must be included in the range:

[AtLeast(lowerBound)] or [GreaterThanOrEqualTo(lowerBound)]

leaving the underlying parameter type to specify the upper bound implicitly by virtue of the fact that every C# type inherently has a range bound as a consequence of its type.

The BoundedBy and Range attributes can be decoupled.

An attribute may be specified to take "either int or string" at a given parameter position. One can write multiple constructors for a custom attribute so one may take different types at the same position, or do this with named parameters.

This concludes the discussion of exclusions.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a process for compile-time bounds checking of user-defined types, namely, types which are not built-in, the process comprising the following steps performed during compilation of a program from a source code through an intermediate language code to an executable code:
    identifying in the source code a user-defined class for safely accessing memory, namely, a user-defined class having as an annotated member a memory-accessing code which is annotated with a user-defined-bounds check annotation comprising one or more of: a field-contains bound annotation indicating that a field in the user-defined class contains a bound for the memory-accessing method and a bound-getter method annotation indicating that the bound-getting method in the user-defined class returns a bound for the memory-accessing method, and also having as another annotated member a bound-providing member which is annotated to indicate that it provides bound information for generating a bounds check on the memory-accessing code, wherein the user-defined class is defined free of any multi-element array type as a constituent type;
    inserting into the intermediate language code a bounds-check representation of the user-defined-bounds check annotation; and
    applying an optimization which reduces duplicative bounds checking that would otherwise occur in the executable code.

2. The configured medium of claim 1, further comprising inserting bounds checking code into the intermediate language code in response to bounds-check representations, and wherein the applying step applies the optimization to inserted bounds checking code rather than applying the optimization to bounds-check representation(s).

3. The configured medium of claim 1, wherein the applying step applies the optimization to bounds-check representation(s) rather than applying the optimization to bounds checking code in the intermediate language code.

4. The configured medium of claim 1, wherein the identifying step identifies a memory-accessing method annotated with an accesses-explicitly-allocated-memory annotation.

5. The configured medium of claim 1, wherein the identifying step identifies an annotation indicating user-defined bounds checking to supplement system-defined bounds checking of a built-in type.

6. The configured medium of claim 1, wherein the identifying step identifies an annotation indicating user-defined bounds checking to supplement system-defined bounds checking of a garbage-collector-managed type.

7. A process for a program developer to manage compile-time bounds checking of user-defined types, namely, types which are not built-in, the process comprising the following steps performed during compilation of a computer program from a source code through an intermediate language code to an executable code:
    obtaining the source code of the computer program;
    specifying a user-defined data type in the source code, wherein the user-defined data type is defined free of any multi-element array type as a constituent type;
    locating a memory-accessing method which is defined by the user-defined data type;
    annotating the memory-accessing method with an accesses-explicitly-allocated-memory annotation;
    annotating the source code with at least one of the following:
        a field-contains-bound annotation indicating that a field defined by the user-defined data type contains a bound for the memory-accessing method,
        a bound-getter-method annotation indicating that a bound-getting method defined by the user-defined data type returns a bound for the memory-accessing method;
    inserting into the intermediate language code a bounds-check representation of the user-defined-bounds check annotation; and
    applying an optimization which reduces duplicative bounds checking that would otherwise occur in the executable code.

8. The process of claim 7, further comprising annotating the source code with an annotation denoting a second bound for the memory-accessing method.

9. The process of claim 7, wherein the user-defined type wraps a built-in managed type.

10. A computer system comprising:
    a logical processor;
    a memory in operable communication with the logical processor;
    a source code residing in the memory and having a user-defined type, namely, a type which is not built-in and which is defined free of any multi-element array type as a constituent type, the user-defined type having a memory-accessing method which is annotated with a user-defined-bounds check annotation, wherein the user-defined bounds check annotation comprises one or more of: a field-contains bound annotation indicating that a field in the user-defined data type contains a bound for the memory-accessing method and a bound-getter method annotation indicating that the bound-getting method in the user-defined data type returns a bound for the memory-accessing method, the user-defined type also having at least one bound specifier;

a compiler residing in the memory and configured to insert into an intermediate language code a bounds-check representation of the user-defined-bounds check annotation; and an optimizer residing in the memory and configured to apply an optimization to intermediate language code in order to reduce duplicative bounds checking that would otherwise occur in the executable code.

11. The system of claim 10, wherein the annotated source code comprises device driver source code, and the user-defined type corresponds to a memory-mapped buffer.

12. The system of claim 10, wherein the source code comprises garbage-collected data types, and the user-defined type corresponds to explicitly allocated memory.

13. The system of claim 10, further comprising intermediate language code residing in the memory and annotated with a bounds-check representation of the user-defined-bounds check annotation.

14. The system of claim 10, wherein the compiler is configured to insert bounds checking code for user-defined-bounds check annotations and for built-in types.

15. The system of claim 10, wherein the user-defined type has a data layout which is not controlled by the compiler.

16. The system of claim 10, wherein user-defined-bounds check annotation indicates supplemental bounds checking, in that the user-defined type wraps a built-in type which the compiler is configured to already bounds check in the absence of any user-defined-bounds check annotation.

17. The configured medium of claim 1, wherein the user-defined class wraps a built-in managed type.

18. The configured medium of claim 1, wherein the user-defined class has a data layout which is not controlled by a compiler which performs the compilation.

19. The configured medium of claim 1, wherein the user-defined class corresponds to a memory-mapped buffer.

20. The process of claim 7, wherein the user-defined type corresponds to a memory-mapped buffer.

* * * * *